Patented May 16, 1939

2,158,241

UNITED STATES PATENT OFFICE 2,158,241

INSECTICIDE AND PROCESS OF MAKING THE SAME

Sisto E. Marsico, Aspinwall, Pa.

No Drawing. Application June 18, 1936, Serial No. 86,000

2 Claims. (Cl. 167—24)

This invention relates to a liquid insecticide comprising an intimate and substantially stable mixture or dispersion of a rotenone solution, a pyrethrin solution, nicotine, and a copper sulphate solution, and to a process for producing such insecticide.

An object of the present invention is to provide an intimate and substantially stable mixture of the above character which will provide a very efficient insecticide for spraying purposes when highly diluted in water and which will give a very satisfactory substantially stable suspension when so diluted.

Another object of the present invention is to provide a liquid insecticide containing improved rotenone and pyrethrin solutions exhibiting unusually high toxic powers.

An advantage of the present invention is the fact that the mixture may be shipped in concentrated form, whereupon the required quantity need only be added to water for use and then stirred gently to form a substantially stable suspension in which the active ingredients are thoroughly dispersed and intimately mixed.

In carrying out my invention, commercially pure or 90% rotenone is dissolved in chloroform liniment (U. S. P.), in substantially the proportions of 1 gram of rotenone to 40 cc. of chloroform liniment. I have found that the chloroform liniment not only causes the rotenone to quickly and completely dissolve, but the resulting solution exhibits unusually high toxic power.

A pyrethrin extract is then produced by immersing coarsely granulated pyrethrum flowers in chloroform liniment, macerating the same for about two hours and then filtering out the resultant liquid or extract. In this step, the pyrethrum flowers are used in the proportion of 2 ounces of the same to 400 cc. of chloroform liniment, and the resultant solution has been found to exhibit exceptionally high toxic powers, probably partially due to the substantially complete extraction of pyrethrins.

I then dissolve copper sulphate in water, in the proportions of 2 ounces of copper sulphate to 500 cc. of water, after which a final solution of soft green soap is prepared by dissolving 1 ounce of such soap in 200 cc. of water.

The above described rotenone, pyrethrin, copper sulphate, and green soap solutions are then mixed together and added to pine oil and commercially pure or 90% nicotine, in the proportions of substantially 20% of rotenone solution, 20% of pyrethrin solution, 10% pine oil, 15% green soap solution, 30% nicotine, and 5% copper sulphate solution. An important discovery which I have made is that both the green soap solution and the pine oil are necessary to bring about a complete intimate mixture or dispersion of the rotenone solution, pyrethrin solution, nicotine, and copper sulphate solution, and to maintain such mixture or dispersion substantially stable. In other words, the active ingredients will remain intimately mixed or dispersed and in suspension substantially indefinitely, and this is true when the resulting concentrated mixture or preparation is mixed with water to provide a highly diluted preparation for spraying. It is particularly noted that both the green soap solution and pine oil, in substantially the proportions stated, are essential to this result, the use of either the pine oil or the green soap solution alone or in widely different proportions not being productive of this result.

While the rotenone solution, pyrethrin solution, nicotine, and copper sulphate solution are individually very effective poisons, I have found that they are rendered comparatively ineffective when highly diluted in water for spraying purposes, unless all of them are employed together and in substantially the proportions set forth above. At the same time, the simultaneous use of all of these poisons or active ingredients naturally widens the range of use and effectiveness of the insecticide as regards the kind of insects which may be destroyed thereby.

The present invention has been evolved as the result of varied and numerous experiments extended over a considerable period of time, with the result that an insecticide has been produced which exhibits marked increased efficiency as compared to similar insecticides heretofore available. In addition to this, I have discovered the production of a rotenone solution in which the rotenone is most completely dissolved and which exhibits exceptionally high toxic power. This is also true to an extent with respect to the toxic powers of the pyrethrin solution, and I am aware of no one heretofore discovering these desirable characteristics had by the use of chloroform liniment as a solvent for rotenone and as a liquid for the extraction of pyrethrins for the production of a pyrethrin solution. Finally, if the pine oil and green soap solution are not simultaneously employed in susbtantially the proportions stated, the active ingredients will begin to separate out almost immediately after being mixed. Obviously, no satisfactory or efficient insecticide can be had unless there is a substantially stable dispersion or suspension of the active ingredients and an intimate or thorough mixture thereof.

It is to be understood that the term "chloroform liniment", as used herein, refers to the composition, or its full equivalent, given in the Xth edition of the U. S. P. and composed of 30% chloroform and 70% camphor soap liniment, the camphor soap liniment being composed of hard soap 60 gr., camphor oil 45 gr., oil of Rosemary 10 cc., alcohol 700 cc. and sufficient distilled water to make 1000 cc. of the camphor soap liniment.

I have found that chloroform liniment produces a better solution than chloroform and has the advantage of being an emulsifing, wetting and spreading agent. Also, rotenone dissolved in chloroform will separate out in a short time, but when it is dissolved in chloroform liniment it remains sufficiently permanently dissolved for all practical purposes so as to provide an ideal solution for insecticidal use.

Having thus described my invention, what I claim as new is:

1. In an insecticide, a rotenone solution consisting of commercially pure rotenone dissolved in chloroform liniment in about the proportions of 1 gram of rotenone to 40 cc. of chloroform liniment, the chloroform liniment being composed of about 30% chloroform and about 70% camphor soap liniment, and the camphor soap liniment being composed of hard soap, camphor oil, oil of Rosemary, alcohol and distilled water in the proportions of hard soap 60 gr., camphor oil 45 gr., oil of Rosemary 10 cc., alcohol 700 cc., and sufficient distilled water to make 1000 cc. of the camphor soap liniment.

2. In an insecticide, a pyrethrin solution consisting of the liquid extract of pyrethrum flowers macerated in chloroform liniment in about the proportions of 2 ounces of pyrethrum flowers to 400 cc. of chloroform liniment, the chloroform liniment being composed of about 30% chloroform and about 70% camphor soap liniment, and the camphor soap liniment being composed of hard soap, camphor oil, oil of Rosemary, alcohol and distilled water in the proportions of hard soap 60 gr., camphor oil 45 gr., oil of Rosemary 10 cc., alcohol 700 cc., and sufficient distilled water to make 1000 cc. of the camphor soap liniment.

SISTO E. MARSICO.